United States Patent
Danziger

(12) 
(10) Patent No.: US 6,404,952 B1
(45) Date of Patent: Jun. 11, 2002

(54) OPTICAL COMMUNICATION SYSTEM WITH CHROMATIC DISPERSION COMPENSATION

(75) Inventor: Yochay Danziger, Rishon le Zion (IL)

(73) Assignee: LaserComm Inc., Plano, TX (US)

(*) Notice: Subject to any disclaimer, the term of this patent is extended or adjusted under 35 U.S.C. 154(b) by 0 days.

(21) Appl. No.: 09/249,830
(22) Filed: Feb. 12, 1999

Related U.S. Application Data
(60) Provisional application No. 60/079,423, filed on Mar. 26, 1998, provisional application No. 60/089,350, filed on Jun. 15, 1998, and provisional application No. 60/091,026, filed on Jun. 29, 1998.

(51) Int. Cl.[7] .................................. G02B 6/26
(52) U.S. Cl. ..................... 385/28; 385/24; 385/37; 385/123; 359/161
(58) Field of Search ............... 385/24–29, 35, 385/37, 123–128, 142–144; 359/161, 173, 179, 189, 195, 280, 282

(56) References Cited

U.S. PATENT DOCUMENTS

| | | | |
|---|---|---|---|
| 4,804,248 A | 2/1989 | Bhagavatula | 350/96.15 |
| 4,974,931 A | * 12/1990 | Poole | 385/28 |
| 5,185,827 A | * 2/1993 | Poole | 385/28 |
| 5,261,016 A | 11/1993 | Poole | 385/28 |
| 5,448,674 A | 9/1995 | Vengsarkar et al. | 385/123 |
| 5,802,234 A | 9/1998 | Vengsarkar et al. | 385/123 |

FOREIGN PATENT DOCUMENTS
| | | |
|---|---|---|
| DE | 24 33 153.1 | 7/1974 |
| DE | 2433153 | 1/1976 |

OTHER PUBLICATIONS

Goel, A. et al., "Wide–Band Dispersion Compensating Optical Fiber," IEEE Photonics Technology Biology Letters, vol. 8, No. 12, Dec. 1996.

Poole, Craig D. et al., "Optical Fiber–Based Dispersion Compensation Using Higher Order Modes Near Cutoff," 8217 Journal of Lightware Technology, vol. 12, No. 10, Oct. 1994, New York, NY.

* cited by examiner

Primary Examiner—Frank G. Font
Assistant Examiner—Sang H. Nguyen
(74) Attorney, Agent, or Firm—Kahn, Simon Mark

(57) ABSTRACT

An optical communication system with dispersion compensation uses transverse mode transformers and a chromatic dispersion compensation optical fiber. A low order spatial mode optical signal from a communication fiber is transformed by a transverse mode transformer into a higher order spatial mode before being injected into a chromatic dispersion compensation optical fiber. The optical signal exiting the compensation fiber is then transformed back to a lower order spatial mode before being injected into a second communication fiber.

26 Claims, 11 Drawing Sheets

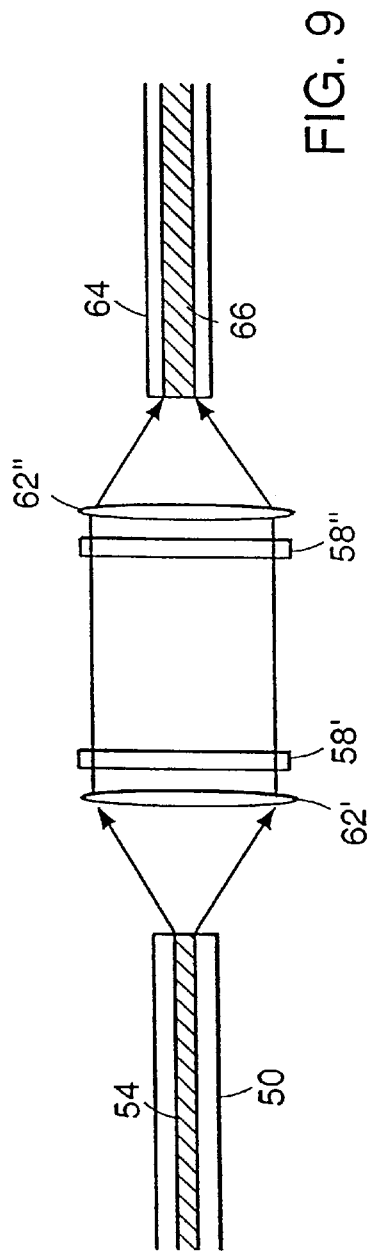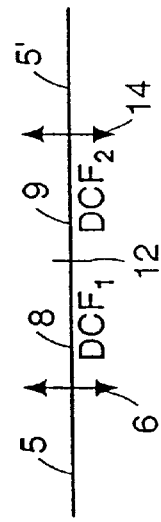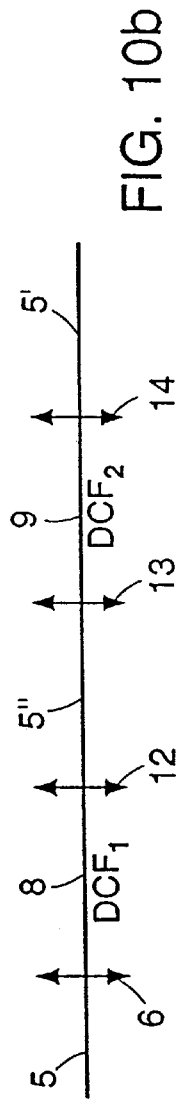

OPTICAL COMMUNICATION SYSTEM WITH CHROMATIC DISPERSION COMPENSATION

CROSS-REFERENCE TO RELATED APPLICATIONS

This application claims priority to provisional U.S. patent application No. 60/079,423 which was filed Mar. 26, 1998, provisional U.S. patent application No. 60/089,350 which was filed Jun. 15, 1998 and provisional U.S. patent application No. 60/091,026 which was filed Jun. 29, 1998 and incorporates by reference U.S. patent application Ser. No. 09/248,969 entitled "Transverse Spatial Mode Transformer for Optical Communication" filed Feb. 12, 1999 and U.S. patent application Ser. No. 09/249,920 entitled "Apparatus and Method for Compensation of Chromatic Dispersion in Optical Fibers" (now U.S. Pat. No. 6,339,665) filed concurrently herewith.

FIELD OF THE INVENTION

The invention relates to fiber optic telecommunication systems and more specifically to chromatic dispersion compensation in such systems.

BACKGROUND OF THE INVENTION

The tendency of a pulse of light propagating through an optical fiber to broaden is a result of the fact that different wavelengths of light pass through the fiber at different speeds. This speed differential which causes the pulse to broaden is termed chromatic dispersion. Chromatic dispersion presents a problem in modern optical communication systems because the tendency of light pulses to broaden as they propagate down the fiber causes the closely spaced light pulses to overlap in time. This overlap can have an undesirable effect since it restricts how closely spaced the pulses can be. This in turn limits the data bandwidth of the optical fiber.

There are many characteristics of dispersion. First order dispersion is the rate of change of index of refraction with respect to wavelength in the fiber. First order dispersion is also referred to as group velocity. Second order dispersion is the rate of change of the first order dispersion with respect to wavelength. Second order dispersion produces the pulse broadening. Third order dispersion is the rate of change of broadening with respect to a change in wavelength. This is often referred to as the dispersion slope.

Several solutions have been proposed to mitigate the effects of dispersion in transmission fibers. One technique involves the use of a compensating optical fiber having an appropriate length and which has a dispersion that is opposite to the dispersion characteristic of the transmission fiber. The result is dispersion in the transmission fiber is substantially matched and canceled by the total dispersion in the compensating fiber. While this technique offers a solution to the dispersion problem, it may be impractical in actual use because of the attenuation due to the required length of the compensating fiber. In such a case, the total transmission length of the fiber is significantly increased thereby increasing the signal attenuation in the fiber. Furthermore, it may be difficult to find a fiber of the desired length with the required dispersion properties.

It is also difficult to design a fiber having a changing index of refraction across the diameter of the fiber (the fiber index profile) that will compensate simultaneously for the second and third dispersion orders. It is even more difficult to control the material properties of such fibers even in the most accurate fabrication process necessary to produce such fibers. In addition, the process of fabricating the single compensating chromatic dispersion fiber is expensive and generally not practical.

When a pulse of light is transmitted through an optical fiber, the energy follows a number of paths which cross the fiber axis at different angles. A group of paths which cross the axis at the same angle is known as a mode. Sometimes it is necessary to limit or control the number of modes used in a transmission system. The fundamental mode $LP_{01}$ in which light passes substantially along the fiber axis is often used in high bandwidth transmission systems using optical fibers commonly referred to as single mode fibers.

The dispersion properties of high order modes have been investigated at length. There is a dependence of high order mode dispersion on wavelength and on the properties of the fiber. By properly designing the fiber index profile it is possible to make the dispersion slope be positive, negative or zero. It is also possible to make the magnitude of the dispersion be negative, zero or slightly positive. Using these two properties one can either control or compensate for the dispersion in any transmission fiber.

Systems have been developed to take advantage of higher order modes to compensate for dispersion in a typical optical communication system. In such systems it has been necessary to first convert the lower order fundamental mode of the light to a higher order spatial mode. This is accomplished using longitudinal mode conversion.

Prior art methods for mode conversion are known as longitudinal mode conversion and are based on introducing a periodic perturbation along the fiber axis. The length of each period and the number of periods in these longitudinal converters must be determined accurately according to the wavelength, the strength of the perturbation, and the modes involved. By constructing a longitudinal mode converter it is possible to achieve good efficiency in transferring the energy from one mode to the other in a limited spectral bandwidth. This spectral property has been used in Dense Wavelength Division Multiplexing (DWDM) applications in telecommunications for other applications. Unfortunately, this technique is accompanied by significant energy attenuation and it cannot be used over broad spectral bandwidths.

Another deficiency associated with longitudinal mode converters is related to the fact that after the conversion, only a single mode should be present in the fiber. It can be difficult to discriminate between desired modes and undesired modes having almost the same group velocities because unwanted modes can appear at the output of the converter. As the modes propagate, modal dispersion occurs and the pulse broadens. Generally, longitudinal mode converters introduce significant energy attenuation and noise. Therefore, a trade-off must be made between having broad-spectrum capability and the demand for converting the original mode to a pure, single, high-order mode.

One such longitudinal mode converter is discussed in U.S. Pat. No. 5,802,234. Here, a single mode transmission fiber carries the $LP_{01}$ to a longitudinal mode converter. Before conversion in this system, however, it is necessary to couple the single mode transmission fiber to a multimode fiber while maintaining the signal in the basic $LP_{01}$, mode. This coupling is typically difficult to achieve without signal degradation and any misalignment or manufacturing inaccuracies can result in the presence of higher order modes. It is desirable that only the $LP_{01}$ mode propagate initially in the multimode fiber in order to avoid significant noise that degrades the system performance and typically such coupling results in the propagation of additional modes.

The present invention overcomes the disadvantages of longitudinal mode converters and previous attempts to control dispersion in a fiber optic system.

SUMMARY OF THE INVENTION

The present invention relates to an apparatus and method for chromatic dispersion compensated optical communication. The apparatus and method make use of a chromatic dispersion compensation fiber, a first transverse mode transformer at one end of the compensation fiber and a second transverse mode transformer at the other end of the compensation fiber. Each transverse mode transformer is coupled to a transmission fiber. Light from one transmission fiber is transformed by the first transverse mode transformer to a higher order spatial mode before being injected into the chromatic dispersion compensation fiber. Light exiting the chromatic dispersion compensation fiber is transformed by the second transverse mode transformer to a lower order mode before being injected into the other transmission fiber. The chromatic dispersion in the optical communication link is thus substantially reduced.

The present invention features an optical fiber transmission system which includes a chromatic dispersion compensation fiber and a transverse mode transformer. The mode transformer can be used to transform light entering the fiber to a higher or lower spatial mode. In one embodiment, the transmission system includes a transverse mode transformer at each end of the fiber. In another embodiment, a transmission fiber is optically coupled to the transverse mode transformer.

In another aspect, the invention features a method of compensating for chromatic dispersion in an optical system which includes the steps of receiving an optical signal having a first spatial mode, converting the optical signal to a second spatial mode using a transverse mode transformer and injecting it into a chromatic dispersion compensation fiber. The method includes the additional steps of receiving the optical signal from the fiber and converting it to a third spatial mode using another transverse mode transformer. In one embodiment, the first and third spatial modes are the same. In another embodiment, the first spatial mode is lower than the second spatial mode.

BRIEF DESCRIPTION OF THE DRAWINGS

These and other advantages of the invention may be more clearly understood with reference to the specification and the drawings, in which:

FIG. 9 is a block diagram of an alternative embodiment of a transverse mode transformer using two phase elements;

FIG. 10a is a highly schematic diagram of an alternative embodiment of the present invention showing two chromatic dispersion compensation fibers used for multiple order dispersion compensation;

FIG. 10b is a highly schematic diagram of an alternative embodiment of the present invention showing two chromatic dispersion compensation fibers sandwiching a single mode transmission fiber used for multiple order dispersion compensation;

DETAILED DESCRIPTION OF THE INVENTION

Figure 1:
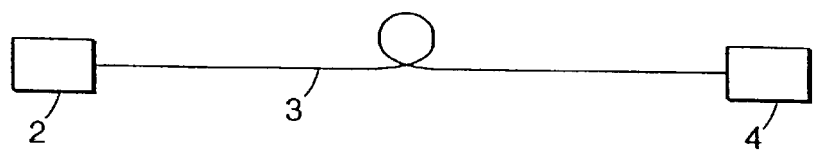
FIG. 1 is a block diagram of an embodiment of a typical fiber optic transmission system known to the prior art.

A typical optical fiber transmission system known in the prior art is shown in FIG. 1. Such a system includes a signal transmitter 2 in optical communication with a single mode fiber (SMF) 3 which is in turn in optical communication with a signal receiver 4. (Other components common to optical fiber systems, such as amplifiers, circulators, isolators, etc. are not shown.) A signal is transmitted from the transmitter 2 into the fiber 3 where it propagates some distance. Depending on the length and other properties of the fiber, significant signal attenuation and dispersion can occur in the fiber. The receiver 4 acquires the attenuated signal as it exits the fiber 3.

Figure 2:
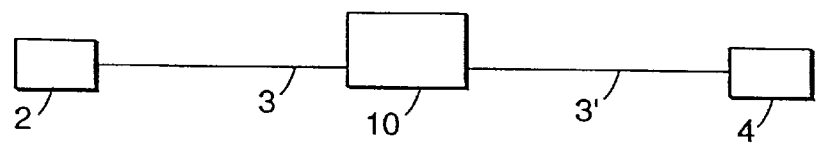
FIG. 2 is a block diagram of an embodiment of the fiber optic transmission system of the present invention including a chromatic dispersion compensation fiber module.

A basic configuration of the system of the present invention is presented in FIG. 2. A transmitter 2 transmits an optical signal into a communication fiber 3. The communication fiber 3 introduces dispersion that requires compensation. The chromatic dispersion compensation module 10 compensates for signal dispersion introduced by the communication fiber 3 before propagating the signal into a receiver 4.

Figure 3:
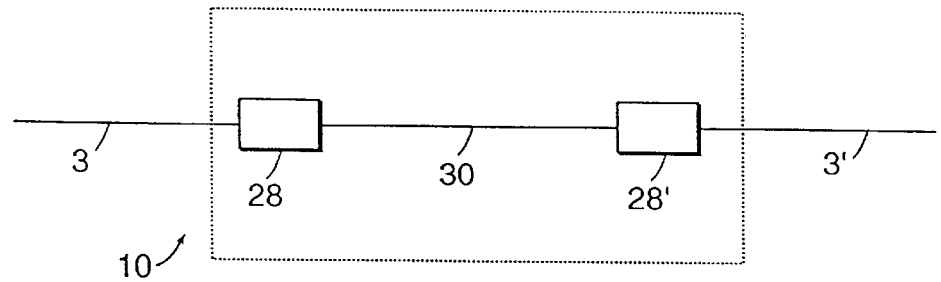
FIG. 3 is a block diagram of an embodiment of the chromatic dispersion compensation fiber module shown in FIG. 2 showing transverse mode transformers and a chromatic dispersion compensation fiber.
Figure 4:
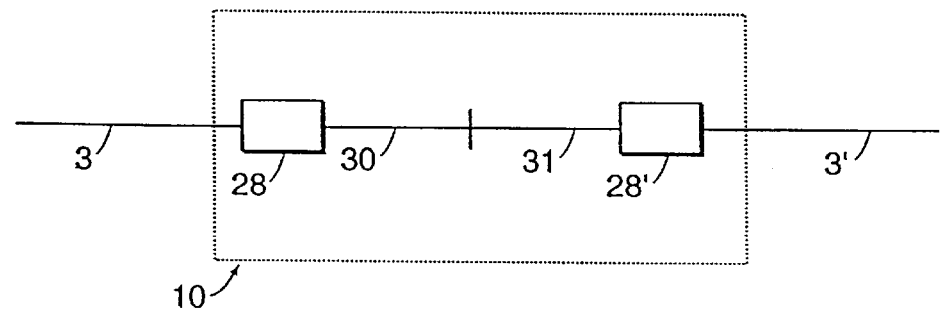
FIG. 4 is a block diagram of another embodiment of the chromatic dispersion compensation fiber module of the present invention showing transverse mode transformers and two chromatic dispersion compensation fibers.

An embodiment of the chromatic dispersion module 10 is shown in FIG. 3. A signal propagating in a single mode fiber (SMF) 3 enters a mode transformer 28 which converts the basic lower order spatial mode, generally $LP_{01}$, to a higher order spatial mode, generally $LP_{02}$, that propagates in a special chromatic dispersion compensating fiber 30. The chromatic dispersion compensation fiber (DCF) 30 is designed to compensate for the first order dispersion of the signal. A second chromatic dispersion compensation fiber 31 with different compensation properties may be coupled to the first chromatic dispersion compensation fiber 30 in order to compensate for dispersion slope as shown in FIG. 4. If required, more than two chromatic dispersion compensation fibers may be used to compensate even higher order dispersion or alternatively for mode filtering applications. Once compensation is complete, the signal is then converted back to the lower order mode by a second mode transformer 28' and emerges from the chromatic dispersion compensation module 10 in the single mode fiber 3'.

Figure 5:
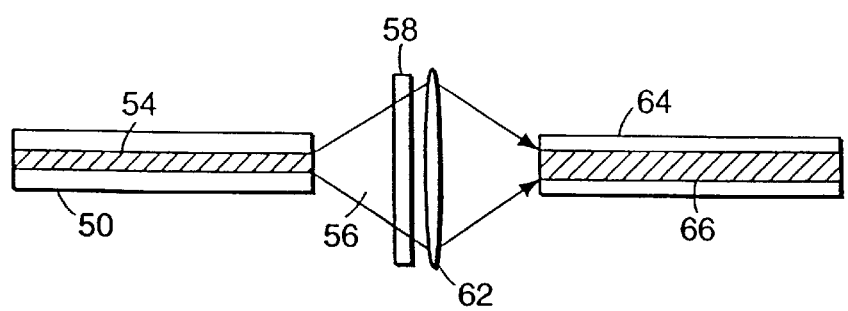
FIG. 5 is a highly schematic diagram of an embodiment of a transverse mode transformer shown in FIG.3.

The mode transformer 28 of the present invention is a bi-directional transverse mode transformer. It can be used to convert a lower order spatial mode to a higher order spatial mode. Conversely, the same transverse mode transformer 28 can be used to convert a higher order spatial mode to a lower order spatial mode. Unlike prior mode transformers which used the longitudinal axis of the fiber to accomplish longitudinal mode conversion, the present transverse mode transformer uses transverse properties of the wavefront of the light to mode convert by selectively altering the phase of at least one portion of the wavefront. One embodiment of a transverse mode transformer is shown in FIG. 5. A transverse phase element 58 arranged perpendicular to the longitudinal axis of the fiber is used to accomplish mode transformation. A pulse of light propagates in a single mode fiber 50 with a small diameter core 54. The pulse broadens into an expanded region 56 as it emerges from the fiber. As the pulse passes through the transverse phase element 58 the phase distribution of the pulse is changed. The phase element 58 can consist of a spatially selective phase element which alters the phase of points on the wavefront as a function of their transverse position. A focusing lens 62 focuses the pulse back into the special chromatic dispersion compensation fiber 64, shown as having a broader core 66 simply for explanatory purposes. In one embodiment the lens 62 is a compound lens. In another embodiment, gradient index (GRIN) lenses are used. The phase element 58 can be any spatially selective phase element, including but not limited to, lenses, mirrors, gratings, electro-optic devices, beamsplitters, reflective elements, graded indexed materials and photolithographic elements.

Phase transformation can be achieved using the properties of spherical aberration inherent in optical lenses. After a wavefront passes through a lens, it will experience spherical aberration. The resulting distorted wavefront can be used with or without a phase element 58 in the transverse mode transformer 28 of the present invention to transform the spatial mode of the original wavefront to a higher order spatial mode.

Figure 6A:
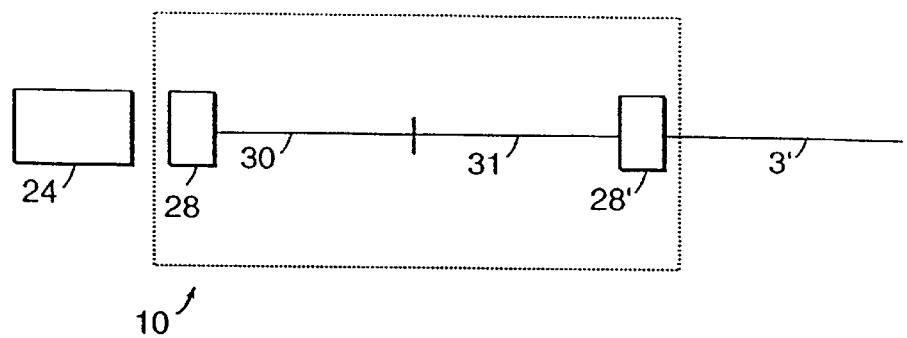
FIG. 6a is a block diagram of an alternative embodiment of a fiber optic transmission system of the current invention with the leading transmission fiber replaced by a transmission source.

FIG. 6a depicts a system in which a transmission source 24 replaces the optical fiber 3 shown in the embodiment in FIG. 4. Here the system does not require an input transmission fiber and retains all the functionality and advantages of the present invention. The transmission source 24 injects an optical signal directly into the chromatic dispersion compensation module 10 where it is pre-compensated before being received by the transmission fiber 3'. Precompensation can be desirable when the transmission fiber 3' has a known dispersion that requires compensation.

Figure 6B:
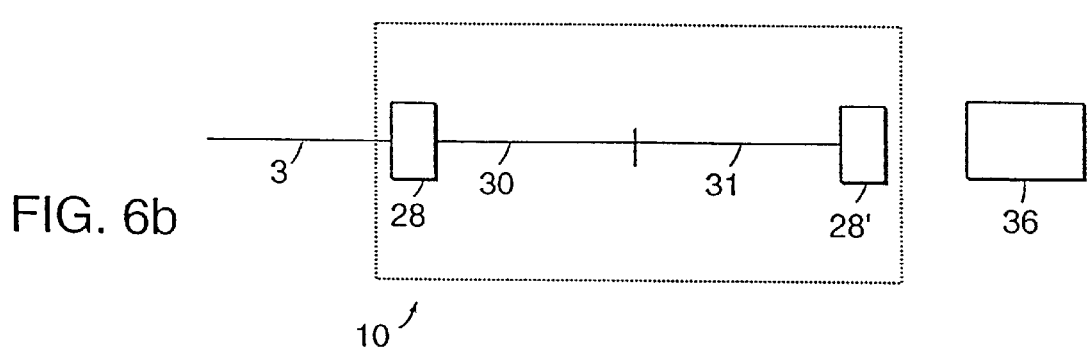
FIG. 6b is a block diagram of an alternative embodiment of a fiber optic transmission system of the current invention with the receiving transmission fiber replaced by a detector.

FIG. 6b describes a system in which a detector 36 replaces the transmission fiber 3' shown in the embodiment in FIG. 4. Here the system does not require an exit transmission fiber 3' and the functionality of the system is not affected. In this case the optical signal propagates in the optical fiber 3 before being compensated by the chromatic dispersion compensation module 10. Once the signal is down converted by mode transformer 28', it is detected directly by detector 36. This method can conserve energy since there will not be fiber coupling losses exhibited before the detector.

Figure 13A:
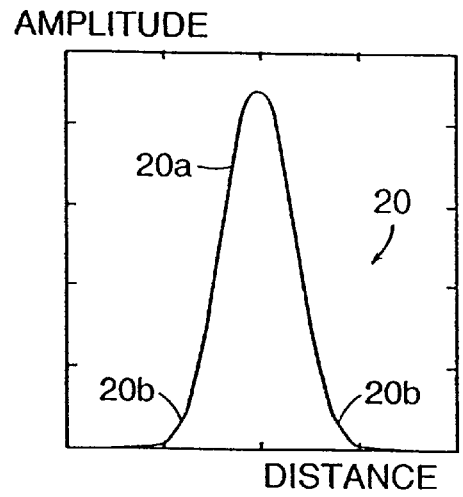
FIGS. 13a–13c are graphs of the amplitude versus position plot of the pulse across the diameter of the fiber before, during and after mode transformation.
Figure 13B:
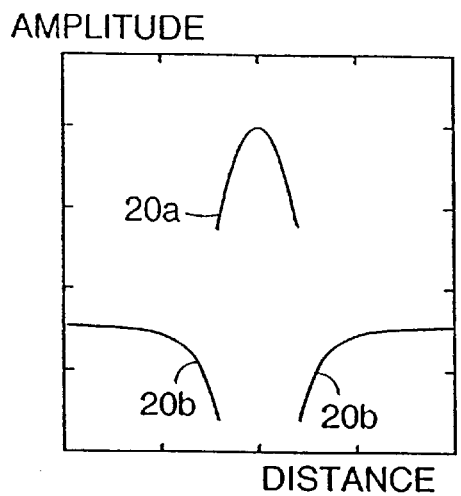
Figure 13C:
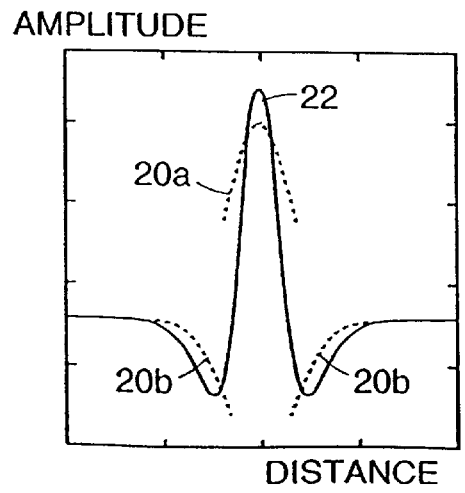

The physical mechanism of the transverse mode transformation presented in this invention is explained with reference to FIGS. 13a to 13c. (FIGS. 13a to 13c share the same horizontal scale.) FIG. 13a illustrates the gaussian-like amplitude distribution of mode $LP_{01}$ in a single mode fiber, wherein the horizontal axis represents the transverse position across the diameter of the fiber in arbitrary units and the vertical axis represents the amplitude in arbitrary units. In one embodiment, the transverse phase element 58 (FIG. 5) introduces a step function to the wavefront 20 of the pulse such that the center region 20a of the wavefront 20 is retarded with in respect to the outer region 20b of the wavefront 20. Therefore, the inner region 20a and the outer region 20b of the wavefront 20 will differ in phase by 180°. After propagation and transformation, the resulting distribution 22 shown in FIG. 13c enters the chromatic dispersion compensation fiber 64 (see FIG. 5). More than ninety percent of the transverse intensity distribution in the $LP_{01}$ mode (see FIG. 7a) is present in the $LP_{02}$ mode (see FIG. 7b) after transformation. The remaining energy is distributed among higher order modes which are not supported by the special chromatic dispersion compensation fiber 64. Therefore, the fiber will contain substantially a single high order mode ($LP_{02}$). The same process, but in the reverse order, occurs in the second mode transformer 28' at the opposite end of the compensation fiber 64. This technique can also be applied to convert between other spatial modes.

Figure 8:
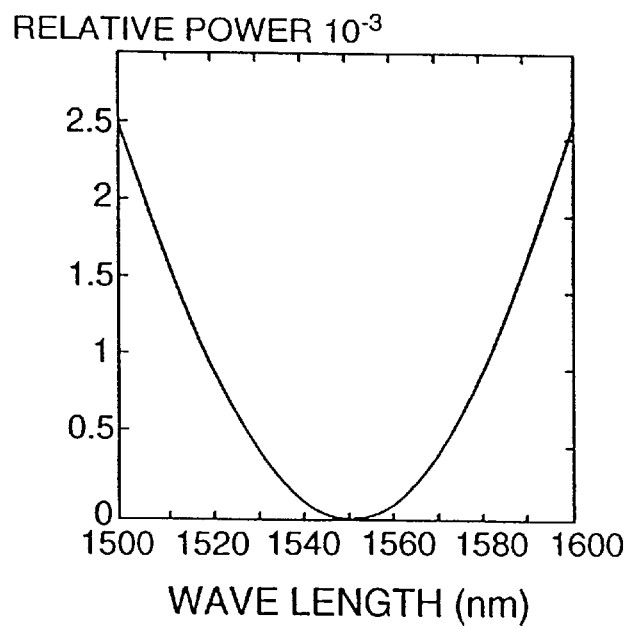
FIG. 8 is a graph of the relative energy in the higher order mode relative to the $LP_{01}$ mode for an element optimized for operation at a wavelength of 1550 nm in an ideal case.

One of the advantages of this transverse transformation mechanism is its high efficiency over a broad spectrum. FIG. 8 shows the residual energy in the $LP_{01}$ mode for an element optimized for operation at 1550 nm. The horizontal axis represents the wavelength of the pulse in nanometers, and the vertical axis represents the ratio between the energy remaining in the low order mode to the total energy of the pulse. Less than one half of a percent of the pulse energy is left in the lowest order mode over greater than 100 nm of spectral range.

In order to further improve the transformation efficiency it is possible to use multiple phase elements 58 and 58' as shown in FIG. 9. The pulse emerging from fiber 50 is collimated by lens 62', then it passes through the two phase elements 58' and 58'' and is finally focused by lens 62' into a special chromatic dispersion compensation fiber 64. This technique reduces longitudinal sensitivity in the placement of the phase elements. The design of phase elements 58' and 58'' can be based on a coordinate transformation technique for converting between spatial modes. The first phase element 58' is designed to have local phase changes across the pulse. Each local phase change redirects (i.e., steers) a small section of the wavefront 20 to a predetermined coordinate on the second phase element 58". As a result, a predetermined intensity pattern is generated at the second phase element 58". The second phase element also induces local phase changes across the wavefront so that the resulting wavefront 20 with predetermined intensity and phase distributions at the second element 58" yields the desired spatial mode.

Another embodiment of the chromatic dispersion compensation module 10 of the present invention is shown in FIG. 10a. This embodiment may be used with transverse mode transformers 28, but is not limited to their use. Any means that propagates a pulse with a higher order mode into an optical coupler 6 can use the invention. After the higher order pulse passes through optical coupler 6, the pulse then enters the first chromatic dispersion compensation fiber ($DCF_1$) 8 which is designed to compensate for the dispersion of the communication fiber 5. $DCF_1$ 8 is spliced to a second dispersion compensation fiber ($DCF_2$) 9 through a splice 12. $DCF_2$ 9 is designed to have minimal second order dispersion at the point where the dispersion slope is maximum. By properly choosing the design parameters, a minimal length of $DCF_1$ 8 and 9 is required to compensate for dispersion. $DCF_1$ 8 and $DCF_2$ 9 can be designed to operate with the basic $LP_{01}$ mode as long as they have different dispersion characteristics. The order in which $DCF_1$ 8 and $DCF_2$ 9 are arranged can be changed. Generally, more chromatic dispersion compensation fibers are required as the number of dispersion orders to be compensated increases. The chromatic dispersion compensated pulse passes into the outgoing optical transmission fiber 5' at splice 14. FIG. 10b illustrates another embodiment of the invention. A single mode fiber is sandwiched between two dispersion compensation fibers. Any number of combinations can be realized without detracting from the essence of the invention.

Figure 11B:
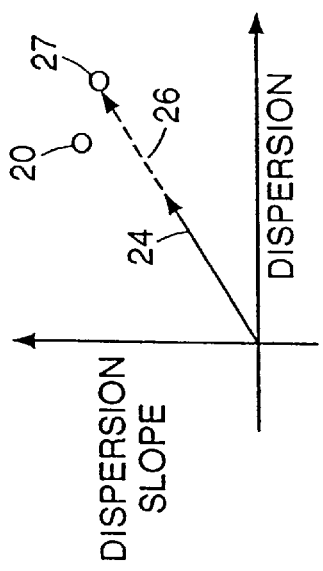
FIGS. 11a–11e are graphs of different solution spaces showing relative design characteristics resulting from the use of first and second order dispersion.
Figure 11D:
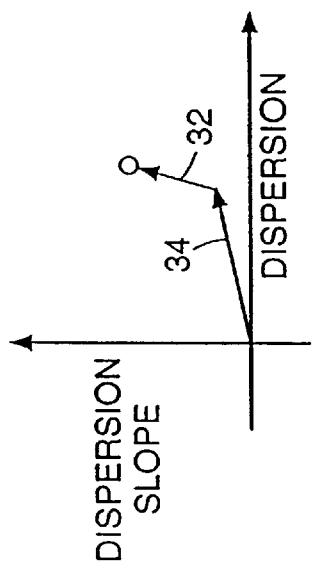
Figure 11E:
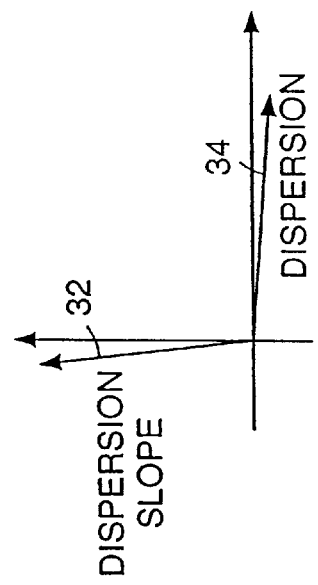
Figure 11A:
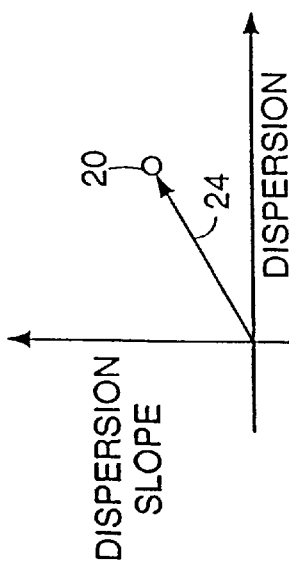
Figure 11C:
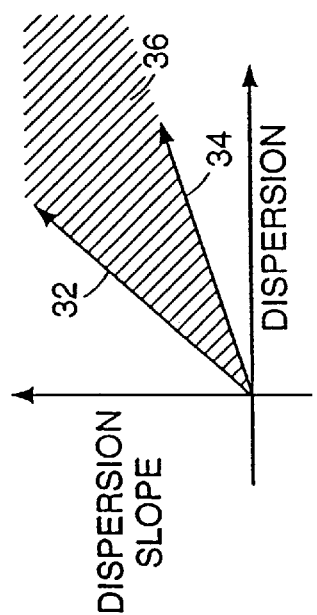

Graphs of possible solutions using the chromatic dispersion compensation fibers of the present invention are shown in FIGS. 11a–11e. The horizontal axes represent the second order dispersion, and the vertical axes represent the second order dispersion slope (i.e., third order dispersion). The dispersion compensation introduced by the chromatic dispersion compensation fibers is presented as arrow 24. FIG. 11a represents an ideal system, where the desired dispersion solution is presented as the point 20. By choosing the proper length of chromatic dispersion compensation fiber, the desired results are achieved. Unfortunately, in conventional communication systems it is difficult to change the relationship between the dispersion orders. Moreover, it is difficult to even predict this relationship before fabrication of the compensation fiber is completed. In addition, this relationship varies strongly according to fabrication processes. Therefore, if the desired amount of dispersion compensation presented at point 20 is displaced as illustrated in FIG. 11b, it is impossible to achieve the desired compensation. It is possible, however, to increase the length of the DCF in order to add length 26 to the arrow 24, so that the actual magnitude of dispersion is increased and the resulting dispersion 27 will approximate the desired dispersion 20.

By combining two or more different fibers it is possible to achieve a variety of dispersion properties. The dispersion properties of $DCF_1$ 8 and $DCF_2$ 9 in FIG. 10a are represented as 32 and 34 in FIG. 11c. The area 36 represents the solution space of dispersion compensation which can be achieved by proper combination of the two fibers $DCF_1$ 8 and $DCF_2$ 9.

FIG. 11d represents an example of such a combination. Using a combination of two or more DCFs, one can compensate for higher orders of dispersion. In order to achieve better coverage of the dispersion possibilities it is desirable to increase the angle between the arrows 32 and 34 in FIG. 11c. It is difficult to achieve this result by using conventional single mode DCFs, however, high order mode-dispersion compensation fibers (HOM-DCF) can achieve more than 90 degrees difference between two different DCFs as presented in FIG. 11e. This system is insensitive to the exact properties of the DCFs, because changing the length of the fibers can compensate for any deviation in the result.

Figure 7A:
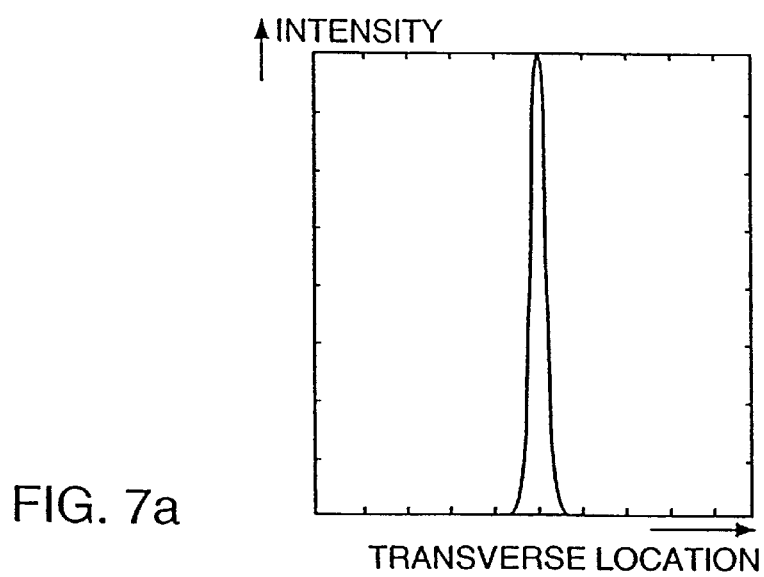
FIG. 7a is a graph of the intensity as a function of position along the diameter of a fiber in an ideal case.
Figure 7B:
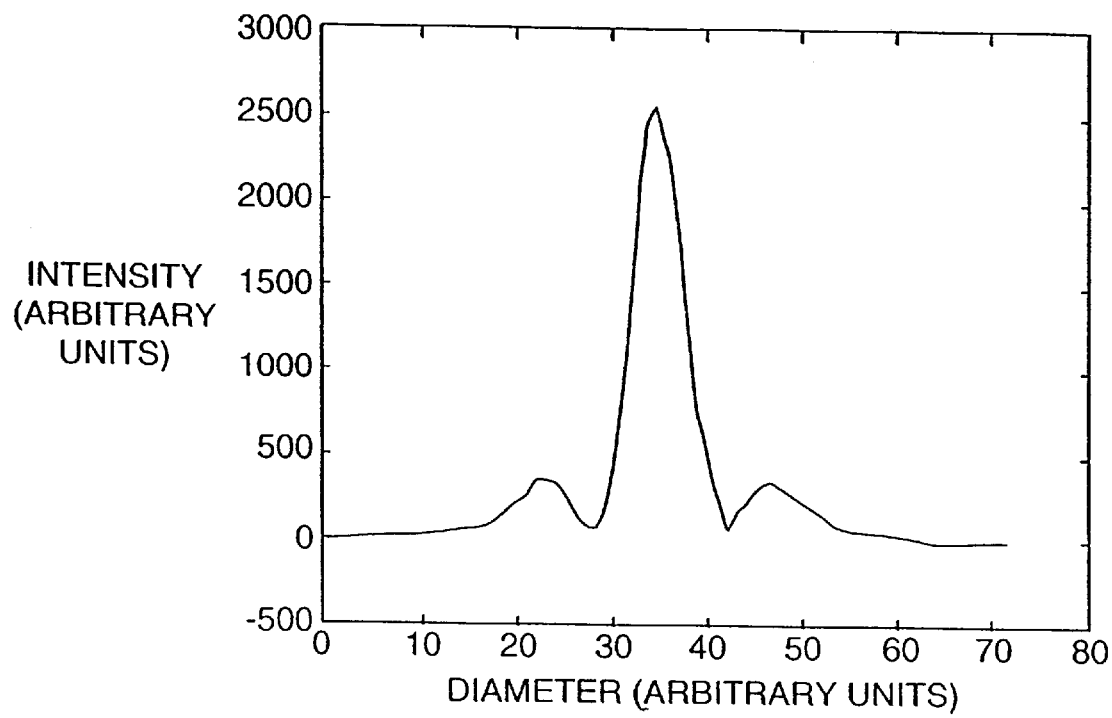
FIG. 7b is a graph of the intensity as a function of position along the diameter of the fiber after transformation to the $LP_{02}$ mode.
Figure 12A:
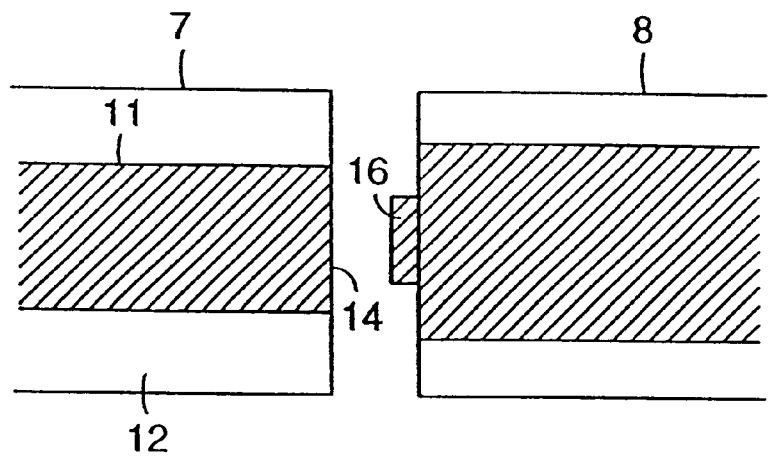
FIGS. 12a–12c are illustrations of alternative embodiments of the transverse mode transformer shown embedded in a fiber optic transmission system.

FIG. 12a depicts an alternative embodiment of the transverse mode transformer of the present invention and shows a connection, between two fibers, designed to modify the wavefront. Both fibers include a core 11 and cladding 12. The face 14 of the transmission fiber 7 can be perpendicular to the face of the dispersion compensation fiber 8 or at a small angle to the DCF 8 in order to eliminate reflection noise. The end face of at least one of the fibers has a predetermined binary pattern 16. The pattern 16 can be etched onto the fiber or be in optical communication with the fiber. The pattern is designed to redistribute a gaussian wavefront such as that corresponding to the $LP_{01}$ mode as depicted in FIG. 7a to the $LP_{02}$ mode as depicted in FIG. 7b. In order to achieve an instantaneous change of the wavefront, the height of the binary pattern is set in one embodiment to 1.5 microns. This height is much smaller than the 'Rayleigh range', which is approximately 50 microns in a conventional fiber. The Rayleigh range is defined as $\pi r^2/\lambda$ where r is the radius of the wavefront and $\lambda$ is the wavelength of the light.

Figure 12B:
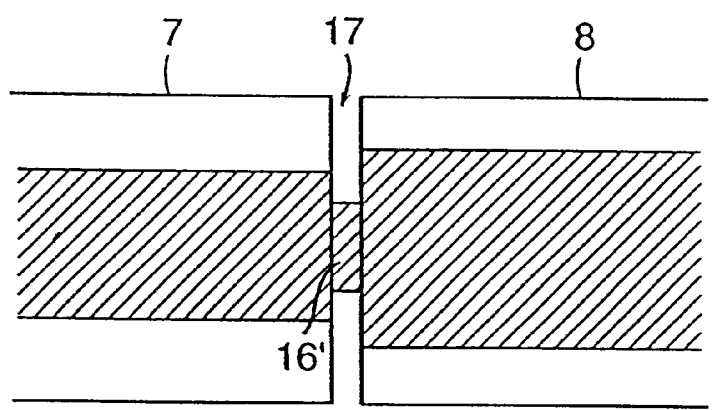
Figure 12C:
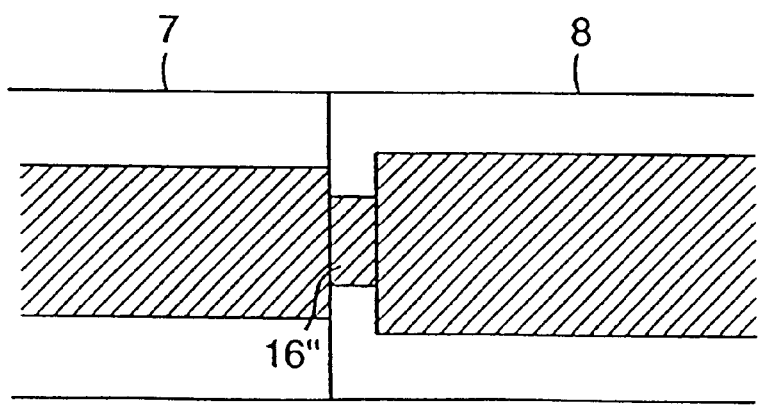

FIG. 12b depicts an embodiment in which the fibers 7, 8 are in contact with each other in order to reduce the relative motion and losses. FIG. 12c depicts the same architecture as in FIG. 12b except that a transparent material (for example the cladding itself) fills the gap 17. In this architecture the height of the pattern 16" can be larger. If the relative refractive index difference between the filled gap 17 and the pattern 16" is set to 4%, then the pattern height is set to 13 microns. This height is still smaller than the 'Rayleigh range'.

The width of the wavefront in a fiber is of the order of microns. Since modern photolithographic methods can achieved sub-micron resolution, photolithography can be used to create the desired pattern on the face of the fiber.

Just as photolithography makes it is possible to accurately etch or coat the desired pattern on the edge of the fiber, multiple lithographic processes make it possible to approximate any continuous pattern. Accurate alignment of the fiber core to the desired pattern can be achieved by illuminating the fiber through the core.

Another method for creating a pattern 16 on the end face of a fiber is to attach a short (i.e., a few tenths of microns in length) fiber having the desired pattern 16. It can also be done by attaching a long fiber to the fiber end face and cutting it to the desired length. This method is more convenient and less expensive in mass production.

Figure 20A:
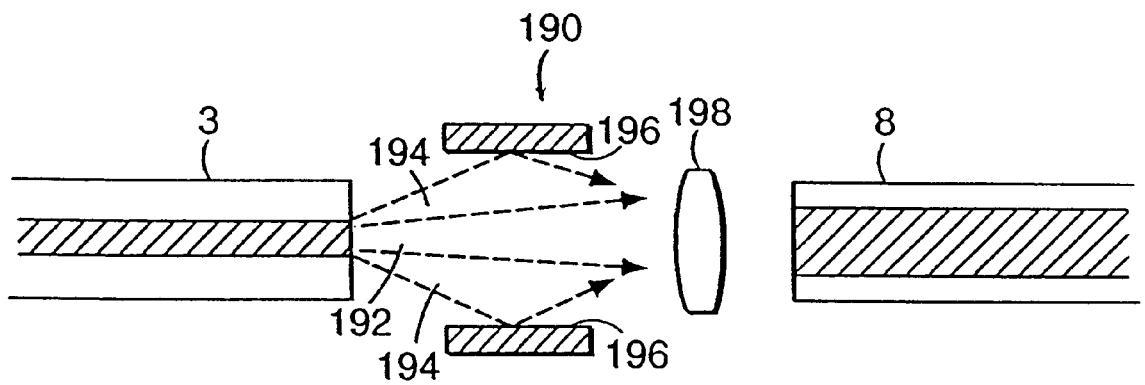
FIGS. 20a–20c are diagrams of alternative embodiments of a transverse mode transformer using internal reflection.
Figure 20B:
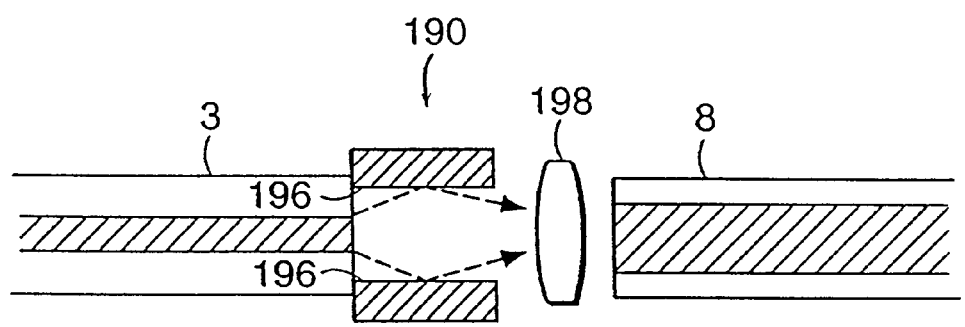
Figure 20C:
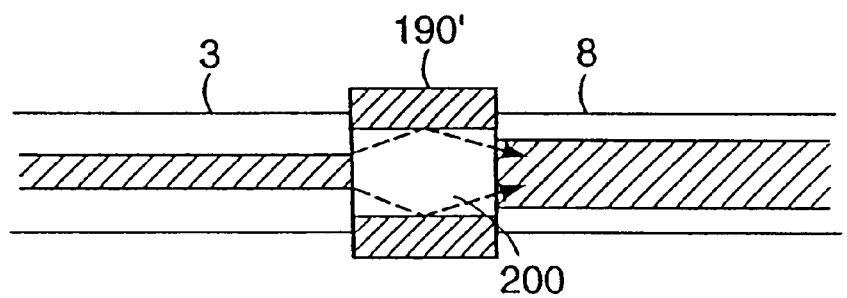

An internally reflective spatial mode transformer 190 of the present invention is illustrated in FIG. 20a. The gaussian beam emerging from the end of a single mode fiber 3 includes a center portion 192 and outer portions 194. The gaussian beam 192 and 194 enters the spatial mode transformer 190 where only the outer portions 194 are reflected from an internal surface 196 back into the center portion 192 so that the interference between the portions 192 and 194 results in a wavefront similar to that of the $LP_{02}$ mode. The resulting wavefront passes through one or more lenses 198 which couple the wavefront into a high order mode fiber 8. The internal surface 196 can be made from a variety of reflectors including, but not limited to, metallic reflective materials and refractive index interfaces (e.g., a segment of optical fiber having a core-cladding interface). FIG. 20b illustrates an internally reflective spatial mode transformer 190 attached to the single mode fiber 3. In another embodiment shown in FIG. 20c, a fiber-based spatial mode transformer 190' is disposed between the ends of the two fibers 3 and 8. The mode transformer 190' includes a short segment of optical fiber with an expanded core 200 of high refractive index. The cores of the two fibers 3, and 8 can be expanded in order to improve the coupling efficiency between spatial modes.

Figure 14:
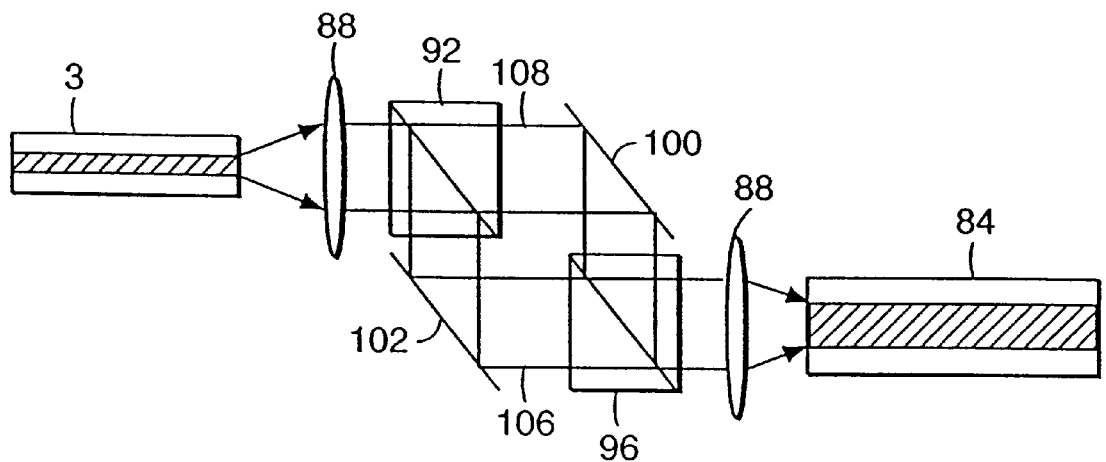
FIG. 14 is an illustration of an alternative embodiment of the current invention using a polarization beam splitter and a polarization combiner.
Figure 15:
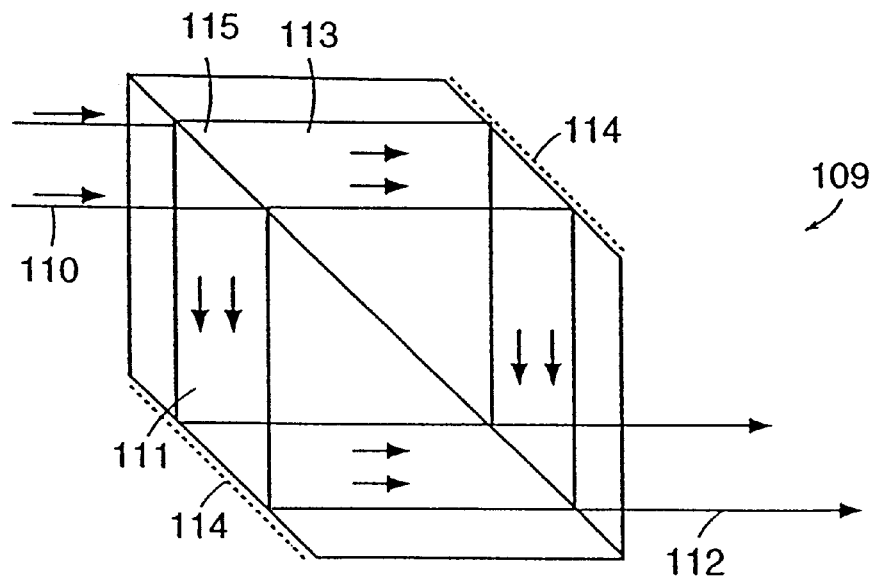
FIG. 15 is a schematic diagram of a single bulk component that can be used to replace the discrete bulk optical components in the embodiment shown in FIG. 14.

The transverse transformation process is insensitive to the polarization of the propagating pulse. However, in many applications it is necessary to introduce different phase shifts to the different polarizations of the pulse. This can be desirable because the polarization of the $LP_{01}$ mode in the single mode fiber can be different from that of the higher order modes such as the $TE_{01}$ mode. FIG. 14 depicts an embodiment for such an application. In this embodiment a collimating lenses 88, a polarization beamsplitter 92, and a combiner 96 are conventional bulk elements. Special mirrors 100 and 102 perform the transverse mode transformation. These mirrors 100 and 102 are designed to introduce phase changes to the reflected wavefronts. One way of achieving this is by etching patterns on the mirrors themselves. In another embodiment, the transverse mode transformer 28 is constructed as a single bulk component 109 as shown in FIG. 15. The incident optical beam 110 is split into two orthogonally polarized beams 111 and 113 by a polarization beamsplitter 115. Each beam is then reflected by total internal reflection from sides 114, and recombined at polarization beamsplitter 115 into a single output beam 112.

Figure 16:
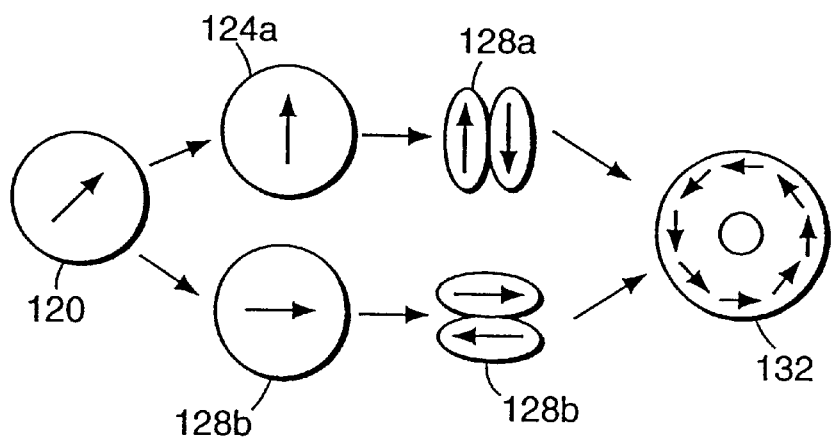
FIG. 16 shows a representation of the polarization of propagating modes through the element described in FIG. 15.

The effect of this element 109 on the polarization of the light passing through it is illustrated in FIG. 16. An arbitrarily polarized pulse 120 is split to its two orthogonal polarization components 124a and 124b by the polarization beamsplitter 115 (not shown). The phase of each component 124a and 124b is changed by the phase elements on the mirrors 114 of FIG. 15 resulting in altered components 128a and 128b. A polarization beamsplitter 115 (not shown) combines the components 128a and 128b into a single annular distribution 132. The orientation of the phase elements on the mirrors 114 which are used to generate the altered components 128a and 128b can be rotated so that all $LP_{11}$ modes can be generated separately. As a result, only a single mode propagates in the DCF 84 of FIG. 14. One advantage is that a polarization-maintaining fiber is not required.

If the polarization of the incident pulse is known (after a polarizer or a polarizing splitter) then it is possible to transform its polarization to match that of the high order modes in the fiber. This polarization transformation can be done with a fine transverse grating. For example, the polarization of the $LP_{01}$ mode (the lowest order mode), which is basically linear and uniform across the mode, can be transformed to an azimuthal one (as that of the $TE_{01}$) by using a transverse grating with a varying local period.

Figure 17:
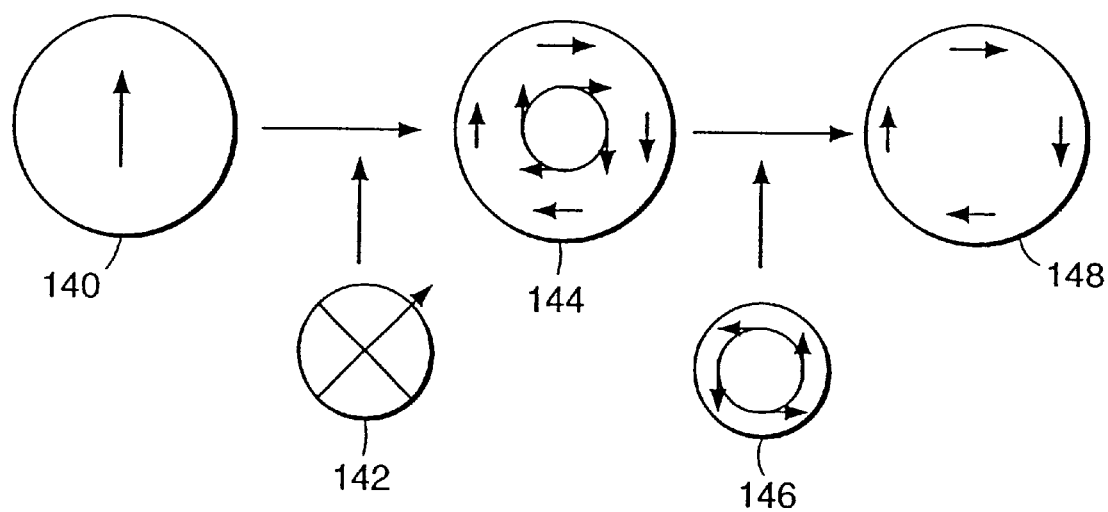
FIG. 17 shows a representation of the polarization of propagating modes using a birefringent element.

Alternatively, a birefringent element can be used. FIG. 17 represents a physical description of the process of transforming a linear polarization towards angular polarization by using a retardation plate. The linear polarization 140 passes through a waveplate having primary axes oriented at an angle to the orientation of the linear polarization 142. The height of the plate is designed to have an angular dependence according to the equation $H_1(r,\theta)=D/(2\pi)\theta$, where D is defined as the depth for which the birefringence waveplate is not changing the orientation of linear polarization. The resulting polarization 144 is shown in FIG. 17. However, this wavefront may have a residual angular phase. Therefore, another non-birefringent element 146 is used to compensate for any residual angular phase. This element introduces the negative angular phase. This phase can be presented as $H_2(r,\theta)=-F/(2\pi)\theta$, where F is calculated according to the residual angular phase. The same effect can be achieved also by using two retardation waveplates having opposite angular phases and their primary axis oriented at opposite angles to the linear polarization.

Figure 18:
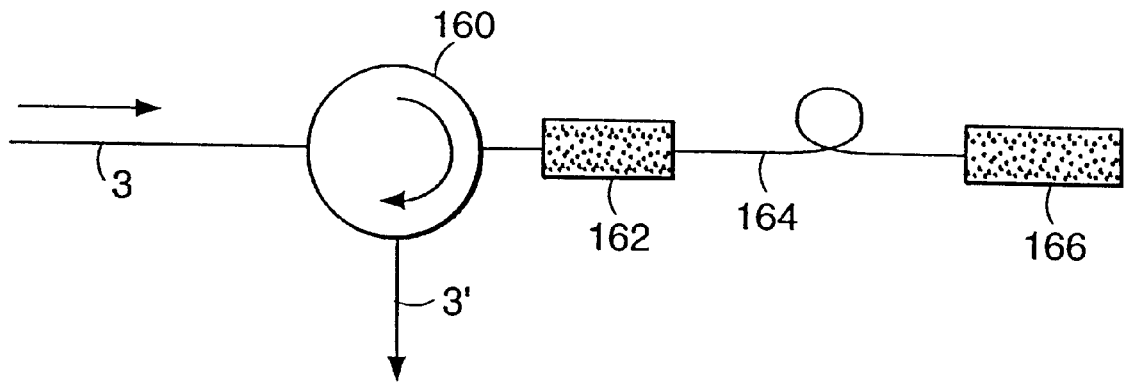
FIG. 18 is a block diagram of an alternative embodiment of the current invention designed to eliminate the sensitivity of the system to polarization mode dispersion by using a circulator and a Faraday mirror.

The transverse phase elements can be implemented in a few configurations according to the requirements of the complete system. FIG. 18 represents one embodiment of a system according to the present invention which is designed to eliminate the sensitivity of the system to polarization mode dispersion. The light propagating in a single mode fiber 3 enters a circulator 160 or a coupler (not shown). Then the light passes through the transverse mode transformer 162. The light is propagated as a higher order mode in the dispersion compensation fiber 164. A Faraday mirror 166 then reflects the light. After the light has passed again through the dispersion compensation fiber 164 and transverse mode transformer 162, the circulator 160 separates the outgoing light for propagation through fiber 3' from the incoming light propagating through fiber 3.

Figure 19:
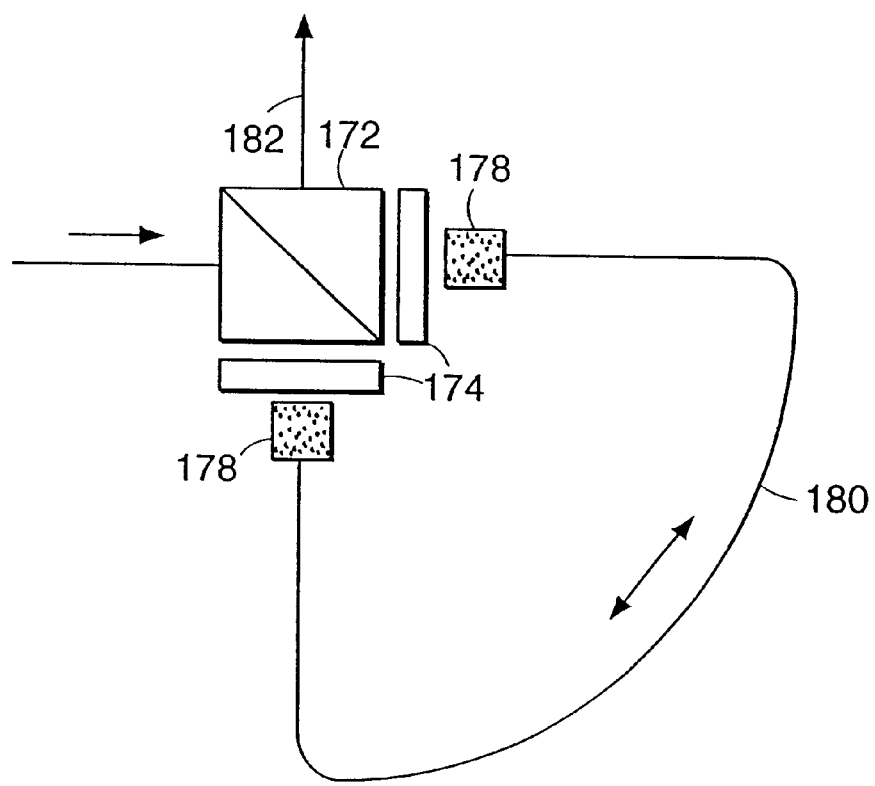
FIG. 19 is a block diagram of an alternative embodiment of the current invention designed to eliminate the sensitivity of the system to polarization mode dispersion without using a circulator.

However, in many applications circulators 160 are not desired because of their expense and complexity. Couplers (i.e., beamsplitters) are also undesirable because they introduce an inherent 50% loss. FIG. 19 represents a configuration in which a circulator or coupler is not needed. The light is separated into its orthogonal polarizations by the polarization splitter 172. Then, each polarization passes through a Faraday rotator 174 imparting a 45° polarization rotation to the polarization and then through a phase element 178. A polarization conserving special fiber 180 or an elliptical special fiber 180 is oriented at 45° so it is parallel to the transmitted polarization. The influence of the two Faraday rotators 174 cancels the rotation introduced by the special fiber 180. As a result, the two polarizations return to their original state and are combined at the polarizer 172 in the same orientation. As the two polarizations are counter-propagating in the special fiber 180, they have the same orientation. Therefore, they will be combined without time difference.

Thus, it is intended that all matter contained in the above description or shown in the accompanying drawings shall be interpreted as illustrative and not in a limiting sense. It is also to be understood that the following claims are intended to cover all of the generic and specific features of the invention described herein.

I claim:

1. An optical communication system, comprising:
    a transverse mode transformer comprising at least one phase element adapted to transform an optical signal having a first spatial mode to an optical signal having a second spatial mode; and
    a high order mode fiber in optical communication with said transverse mode transformer, said high order mode fiber transmitting said optical signal having said second spatial mode.

2. The optical communication system of claim 1, wherein said high order mode fiber is a chromatic dispersion compensation fiber.

3. The optical communication system of claim 1, wherein said second spatial mode is the $LP_{02}$ spatial mode.

4. An optical communication system, comprising:
    a high order mode fiber; and
    a transverse mode transformer comprising at least one phase element in optical communication with said high order mode fiber, said transverse mode transformer adapted to transform an optical signal having a first spatial mode to an optical signal having a second spatial mode.

5. The optical communication system of claim 4, wherein said high order mode fiber is a chromatic dispersion compensation fiber.

6. The optical communication system of claim 4, wherein said first spatial mode is the $LP_{02}$ spatial mode.

7. An optical communication system, comprising:
   a first transverse mode transformer comprising at least one phase element adapted to transform an optical signal having a first spatial mode to an optical signal having a second spatial mode;
   a high order mode fiber in optical communication with said first transverse mode transformer; and
   a second transverse mode transformer comprising at least one phase element in optical communication with said high order mode fiber, said second transverse mode transformer adapted to transform an optical signal having said second spatial mode to an optical signal having a third spatial mode.

8. The optical communication system of claim 7, wherein said high order mode fiber is a chromatic dispersion compensation fiber.

9. The optical communication system of claim 7, wherein said high order mode fiber has a chromatic dispersion and a length sufficient to substantially compensate for a chromatic dispersion of said optical signal having a first spatial mode.

10. The optical communication system of claim 7, wherein said first spatial mode and said third spatial mode are the same.

11. The optical communication system of claim 7, wherein said second spatial mode is the $LP_{02}$ spatial mode.

12. The optical communication system of claim 7 further comprising a transmission fiber optically coupled to said first transverse mode transformer.

13. The optical communication system of claim 7 further comprising a transmission fiber optically coupled to said second transverse mode transformer.

14. The optical communication system of claim 7 further comprising an optical detector optically coupled to said second transverse mode transformer.

15. The optical communication system of claim 7, further comprising an optical source optically coupled to said first transverse mode transformer.

16. An optical communication system, comprising:
   a high order mode fiber having a first end and a second end;
   a first transverse mode transformer comprising at least one phase element optically coupled to said first end of said high order mode fiber;
   a second transverse mode transformer comprising at least one phase element optically coupled to said second end of said high order mode fiber;
   a first transmission fiber optically coupled to said first transverse mode transformer; and
   a second transmission fiber optically coupled to said second transverse mode transformer;
   wherein an optical signal having a first spatial mode from said first transmission fiber is transformed by said first transverse mode transformer to an optical signal having a second spatial mode; wherein said optical signal having said second spatial mode is transmitted through said high order mode fiber; and
   wherein said optical signal transmitted through said high order mode fiber is transformed by said second transverse mode transformer from said second spatial mode to an optical signal having a third spatial mode.

17. The optical communication system of claim 16, wherein said second spatial mode is the $LP_{02}$ spatial mode.

18. The optical communication system of claim 16, wherein said first spatial mode is the $LP_{01}$ spatial mode.

19. The optical communication system of claim 16, wherein said third spatial mode is the $LP_{01}$ spatial mode.

20. The optical communication system of claim 16, wherein said high order mode fiber is a chromatic dispersion compensation fiber.

21. The optical communication system of claim 16, wherein said high order mode fiber has a chromatic dispersion and a length sufficient to substantially compensate for a chromatic dispersion of said optical signal having a first spatial mode.

22. The optical communication system of claim 16, wherein said first transmission fiber and said second transmission fiber are single mode fibers.

23. A method for compensating for chromatic dispersion in an optical communication system, comprising:
   providing a transverse spatial mode transformer comprising at least one phase element;
   receiving an optical signal having a first spatial mode;
   performing a transverse spatial mode transformation on said optical signal utilizing said transverse spatial mode transformer to generate an optical signal having a second spatial mode; and
   transmitting said optical signal having said second spatial mode through a chromatic dispersion compensating waveguide.

24. A method for compensating for chromatic dispersion in an optical communication system, comprising:
   providing a transverse spatial mode transformer comprising at least one phase element;
   receiving an optical signal having a first spatial mode;
   transmitting said optical signal through a chromatic dispersion compensating waveguide; and
   performing a transverse spatial mode transformation on said optical signal utilizing said transverse spatial mode transformer to generate an optical signal having a second spatial mode.

25. A method for compensating for chromatic dispersion in an optical communication system, comprising:
   providing a first transverse spatial mode transformer comprising at least one phase element;
   providing a second transverse spatial mode transformer comprising at least one phase element;
   receiving an optical signal having a first spatial mode;
   performing a transverse spatial mode transformation on said optical signal utilizing said first transverse spatial mode transformer to generate an optical signal having a second spatial mode;
   transmitting said optical signal having said second spatial mode through a chromatic dispersion compensating waveguide; and
   performing a transverse spatial mode transformation on said optical signal utilizing said second transverse spatial mode transformer to generate an optical signal having a third spatial mode.

26. The method of claim 25, wherein said first spatial mode and said third spatial mode are the same.

* * * * *